(12) United States Patent
Sneed

(10) Patent No.: US 6,637,580 B1
(45) Date of Patent: Oct. 28, 2003

(54) TELESCOPING ESCALATOR SEISMIC RESTRAINT

(76) Inventor: Terryle L. Sneed, 430 W. Foothill Blvd., La Canada, CA (US) 91011

(*) Notice: Subject to any disclaimer, the term of this patent is extended or adjusted under 35 U.S.C. 154(b) by 0 days.

(21) Appl. No.: 10/313,439

(22) Filed: Dec. 5, 2002

(51) Int. Cl.[7] ............................................. B65G 21/00
(52) U.S. Cl. .................................................... 198/326
(58) Field of Search ................................ 198/321, 326, 198/327

(56) References Cited

U.S. PATENT DOCUMENTS

| | | |
|---|---|---|
| 6,105,748 A | 8/2000 | Pallinger et al. |
| 6,129,198 A | 10/2000 | Nusime |

FOREIGN PATENT DOCUMENTS

| | | | |
|---|---|---|---|
| JP | 10-291759 | * | 11/1998 |
| JP | 95471 | * | 4/2000 |
| JP | 203782 | * | 7/2000 |
| JP | 158585 | * | 6/2001 |
| WO | 02/10054 | * | 2/2002 |

* cited by examiner

*Primary Examiner*—James R. Bidwell
(74) *Attorney, Agent, or Firm*—James E. Brunton

(57) ABSTRACT

An escalator or moving stairway that is constructed to accommodate oscillation and lateral displacement of a first story relative to a second story of a building between which the escalator or moving stairway extends such as which may occur during an earthquake. The escalator includes novel telescoping connector mechanisms that are connected at one end to a structural support of the building and are connected at the other end to supporting trusses of the escalator in a manner to permit relative movement between the supporting trusses and the floors of the first and second stories of the building.

20 Claims, 8 Drawing Sheets

TELESCOPING ESCALATOR SEISMIC RESTRAINT

BACKGROUND OF THE INVENTION

1. Field of the Invention

The present invention relates generally to moving stairways or escalators. More particularly, the invention concerns a novel connector mechanism for use in interconnecting an escalator system between spaced apart floors of a building.

1. Discussion of the Prior Art

Prior art moving stairways or escalators escalators typically include a support truss and a plurality of interconnected steps that travel in a loop within the truss to provide a continuous movement along a specified path. When the escalator assembly is appropriately mounted between the floors of a building, relative motion of course exists between the moving steps and the stationary structure of the conveyor system. If the escalator assembly is rigidly mounted between the adjacent floors of a building and no provision is made for relative movement between the escalator assembly and the building structure catastrophic failures can occur during an earthquake. For this reason various states including California have adopted specific seismic requirements for escalators.

The California Elevator Code adopted in October, 1998 includes seismic requirements for escalators that require that escalators be connected to their structural supports in such a way as to be capable of resisting specified code seismic forces and, at the time, be sufficiently free to move so that they will not be damaged by the relative movement, called "story drift", of the building structure at the upper and lower landings of the building that are spanned by the escalator assembly.

The latest version of the elevator code, ASME AI7.1, which has not yet been adopted in California, will substantially increase the story drift requirements.

While the existing prior art escalator assembly designs are capable of meeting present code requirements, they will not be capable of meeting the new, more stringent code requirements when they are adopted. Accordingly, the thrust of the present invention is to provide a novel escalator assembly design that will be capable of meeting the substantially more stringent story drift requirements presently to be enacted.

Certain presently existing escalator assembly designs of which applicant is aware accommodate story drift by providing special connection mechanisms at each of the building landings that permit some limited movement between the escalator assembly and affixed to building construction. One form of such prior art connection mechanism includes a first specially designed structural steel member that is interconnected with the escalator structure and a second specially designed, cooperating structural steel member that is interconnected with a fixed structural component of the building structure. More particularly, one of the first and second structural steel members is provided with a rib portion and the other is provided with a slot that receives the rib portion. With this construction the rib portion is free to move within the slot thereby permitting some limited motion between the escalator assembly and fixed structural components of the building structure. While this approach is satisfactory to accommodate small amounts of story drift, it does not provide sufficient structural freedom to safely accommodate substantially greater story drift such as that envisioned by the proposed California codes.

Another prior art escalator assembly design that has been proposed to accommodate story drift requirements caused by earthquakes is disclosed in U.S. Pat. No. 6,129,198 issued to Nusime. The Nusime patent discloses an elevator assembly wherein a first end of the carrier is provided with a bed support which is in turn supported upon a bed formed as part of the building construction by a resilient mounting element which provides damping for vibration and the like passing between the escalator and building construction. A second end of the carrier is similarly provided with a bed support, which is supported upon a fulcrum firmly mounted to the bed. The fulcrum may be in the form of a bolt upon which the bed support is detented. Damping means may be incorporated into the fulcrum construction.

The present invention contemplates an entirely new and novel escalator connection that will both adequately support the escalator system and will accommodate substantial story drift.

SUMMARY OF THE INVENTION

It is an object of the present invention to provide an escalator or moving stairway that is constructed to absorb oscillation and lateral displacement of a first story relative to a second story of a building between which the escalator or moving stairway extends such as may occur during an earthquake.

Another object of the invention is to provide an escalator or moving stairway of the aforementioned character that includes novel connector mechanisms at each floor that are connected at one end to a structural support of the building and are connected at the other end to a supporting truss of the escalator.

Another object of the invention is to provide an escalator of the class described in which the novel connector mechanisms of the invention include cooperating telescoping sections that accommodate movement in both tensile and compressive modes in response to forces generated by an earthquake.

Another object of the invention is to provide an escalator as described in the preceding paragraphs in which the novel connector mechanisms include restraint means for limiting the extent of travel in both the tensile and compressive modes.

Another object of the invention is to provide an escalator or moving stairway as described in the preceding paragraphs in which the novel connector mechanisms include an interconnection means that permits limited movement of the escalator or moving stairway relative to the building construction in response to lateral forces generated by an earthquake.

Another object of the invention is to provide an escalator of the class described in which the novel connector mechanisms permit movement of the escalator relative to the building structure in both a longitudinal and transverse direction and also permits pivotal movement of the escalator relative to the building structure.

DESCRIPTION OF THE INVENTION

Figure 1A:
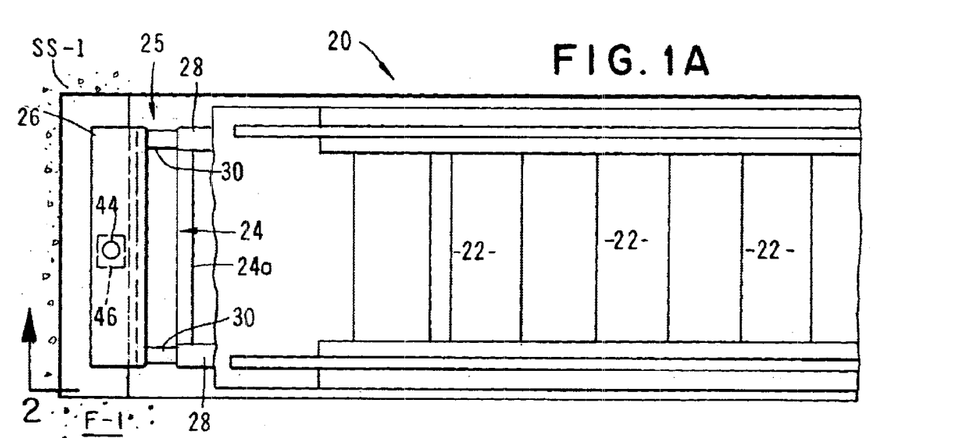
FIGS. 1A and 1B when considered together comprise a top plan view of one form of an escalator assembly of the invention, partly broken away to show a portion of the connector mechanism of the invention.
Figure 1B:
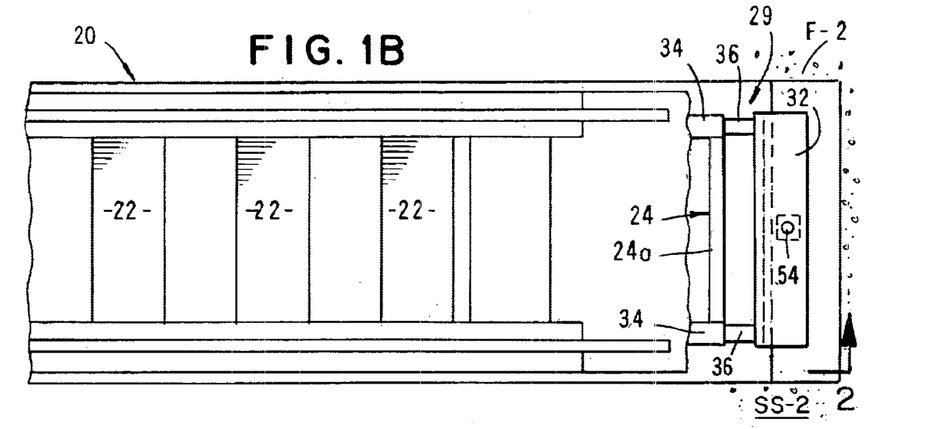
Figures 2A, 6, 7:
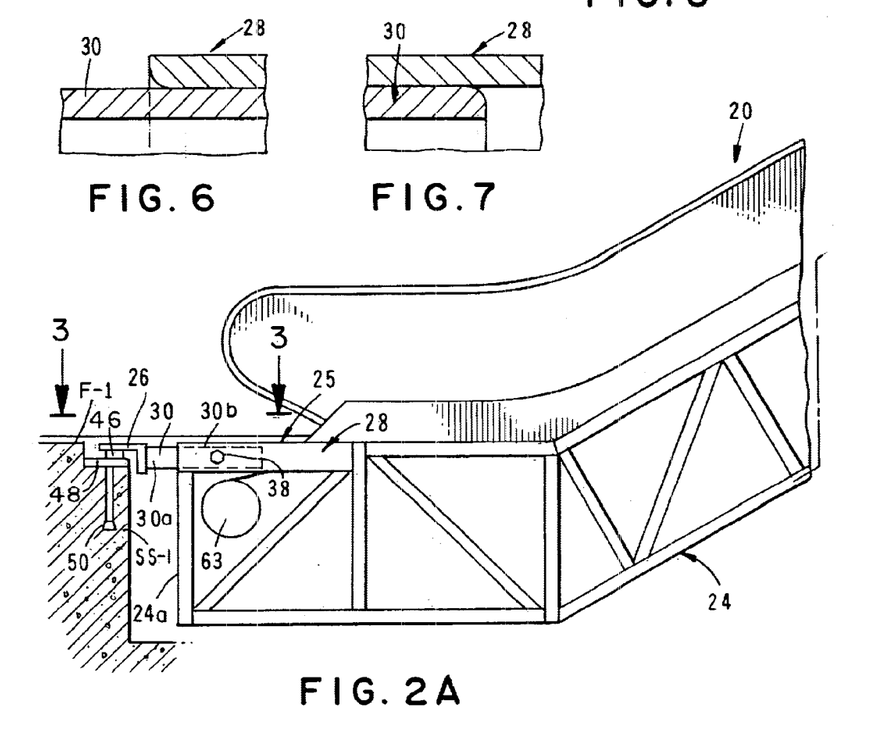
FIGS. 2A and 2B when considered together comprise a view taken along lines 2—2 of Fig. 1A and 1B.
FIG. 6 is a greatly enlarged cross-sectional view of the portion identified in FIG. 5 and as "6—6".
FIG. 7 is a greatly enlarged, cross-sectional view of the portion identified as "7—7" in FIG. 5.
Figure 2B:
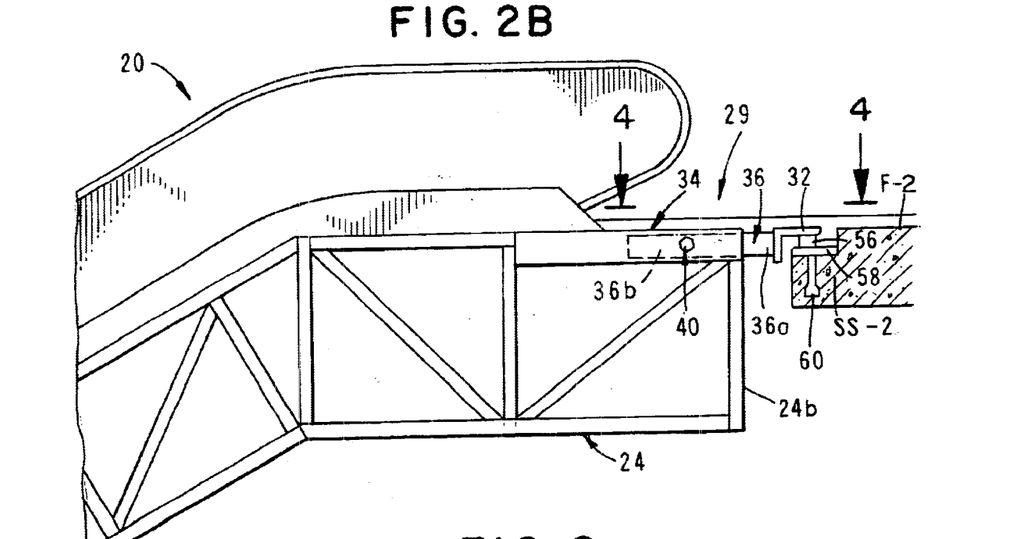
Figure 3:
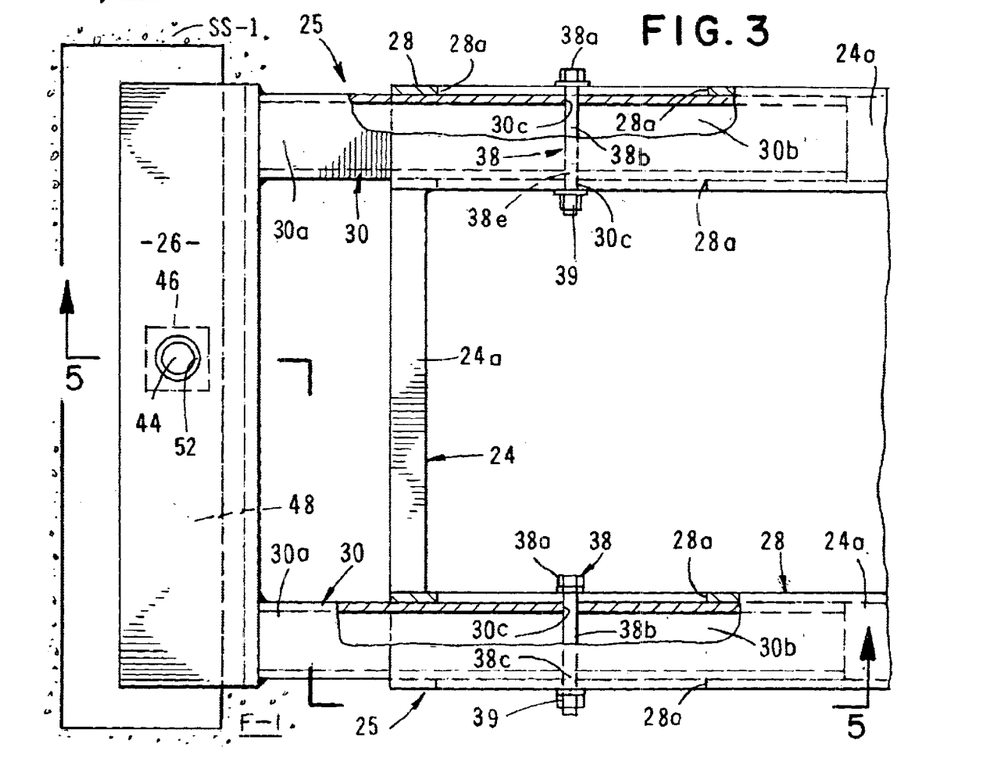
FIG. 3 is a greatly enlarged view taken along lines 3—3 of FIG. 2A.

Referring to the drawings and particularly to FIGS. 1 through 4, one form of the apparatus of the invention is there shown. As best seen by referring to figures 1A, 1B, 1C and 1D, the apparatus of the invention here comprises an escalator 20 of a generally conventional construction having a plurality of moving treads 22, means for moving the plurality of moving treads and a pair of spaced apart supporting trusses 24 for supporting the plurality of moving treads (FIG. 3). Each of the trusses 24 has first and second ends 24a and 24b respectively and, as shown in FIGS. 2A and 2B, each is disposed between a first floor F-1 of a building having a structural support SS-1 and a second floor F-2 of a building having a structural support SS-2.

The improvement to the generally conventional escalator 20 here comprises a first connector means for connecting the first end 24a of each of the supporting trusses of the escalator to the structural support SS-1 of the first floor and a second connector means for connecting the second end 24b of each of the supporting trusses of the escalator to the structural support SS-2 of the second floor. As will presently be described, the first and second connector means are uniquely designed to permit controlled relative movement between the supporting trusses and the first and second floors of the building.

Figure 5:
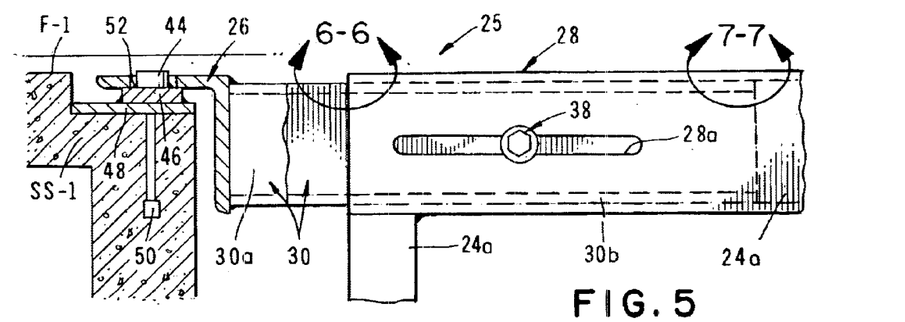
FIG. 5 is a cross-sectional view taken along lines 5—5 of FIG. 3.

As best seen in FIGS. 3 and 5, the first connector means here comprises a first connector mechanism 25 that includes a transverse connector 26 that is connected to the structural support SS-1 of the first floor, a pair of spaced apart second connectors 28 that are connected to first ends 24a of the supporting trusses and a pair of third connectors 30 that are disposed between first and second connectors 26 and 28. Each of the third connectors 30 has a first end 30a connected to first connector 26 and a body portion 30b that is telescopically receivable within second connectors 28. In the form of the invention shown in FIGS. 1 through 14, first connector 26 comprises a structural steel angle member, which is generally L-shaped in cross-section (FIG. 5). Each of the second connectors 28 comprises a tubular steel member that is generally rectangular in cross-section. However, it is to be understood that connectors 28 can be circular in cross-section, or can have any other cross-sectional configuration that may be desired.

The second connector means of the invention is similar in construction to the first connector means and here comprises a second connector mechanism 29 that includes first transverse connector 32 that is connected to the structural support SS-2 of the second floor (FIGS. 2B and 4), a pair of spaced apart second connectors 34 that are connected to the first ends 24b of the supporting trusses and a pair of third connectors 36 that are disposed between first and second connectors 32 and 34. As before, each of the third connectors 36 has a first end 36a that is connected to first connector 32 and a body portion 36b that is telescopically receivable with second connectors 34.

Figure 4:
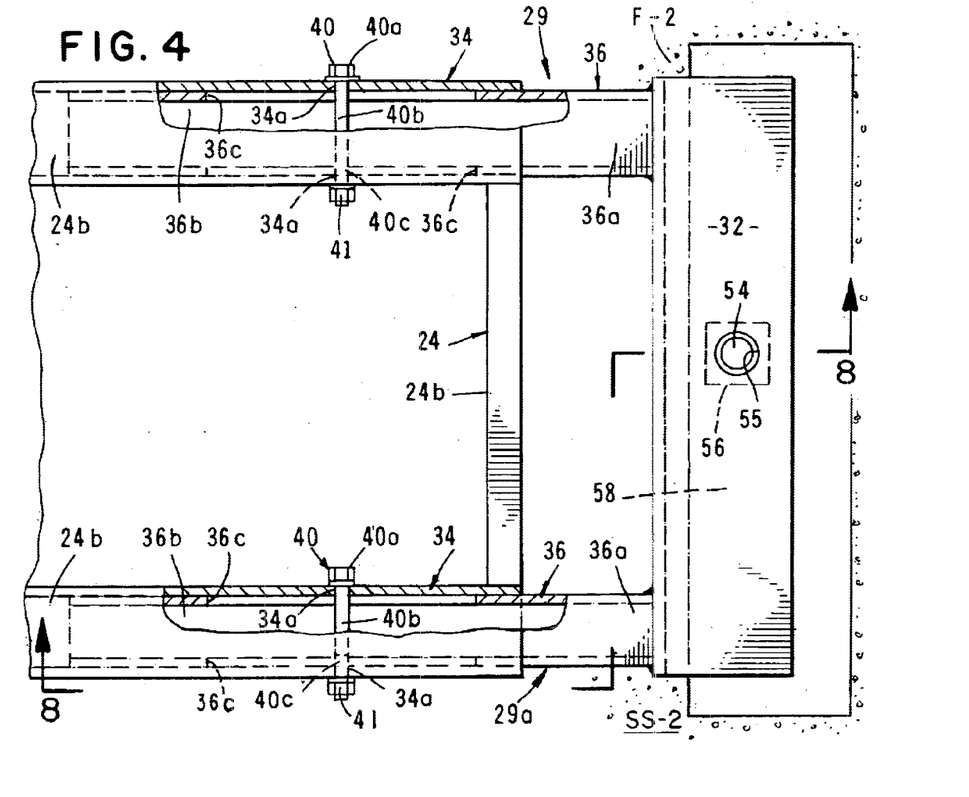
FIG. 4 is a greatly enlarged view taken along lines 4—4 of FIG. 2B.

As illustrated in FIGS. 3 and 4, each of the first and second connector means includes restraint means for limiting the extent of travel of the third connectors relative to the second connectors. In the present form of the invention the restraint means of the first connector means comprises a pair of transversely extending bolts 38 that are carried by connector members 30 (FIG. 3). Each bolt 38 has a first end portion of 38a, a shank portion of 38b and a threaded second end portion of 38c that threadably accepts a nut 39. Bolts 38 extend through spaced apart, indexedly aligned apertures 30c formed in connector members 30 and also extend through indexedly aligned elongated slots 28a formed in the sidewalls of tubular members 28. The head portions 38a of each of the bolts 38 as well as the nuts 39 are in sliding engagement with the outer walls of tubular members 28 so that, in a manner presently to be described, as members 30 telescopically move within tubular members 28, the bolts 38 will reciprocate within slots 28a. With this construction it is apparent that the telescopic movement of members 30 within tubular members 28 is limited by the length of the slots 28a.

Figure 15:
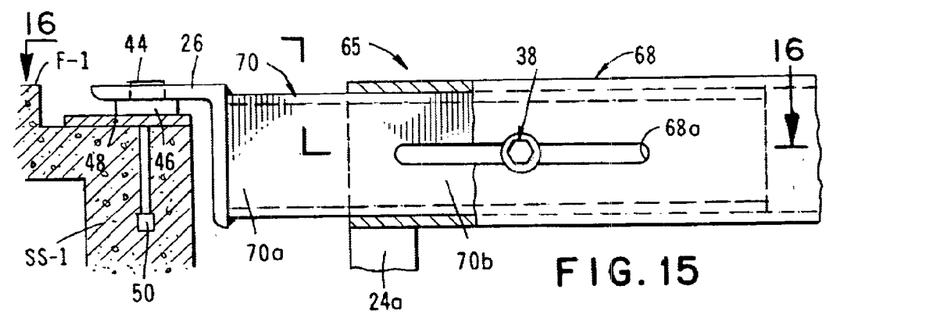
FIG. 15 is a side elevational view, partly in cross-section of an alternate form of connector mechanism of the apparatus of the invention.
Figure 16:
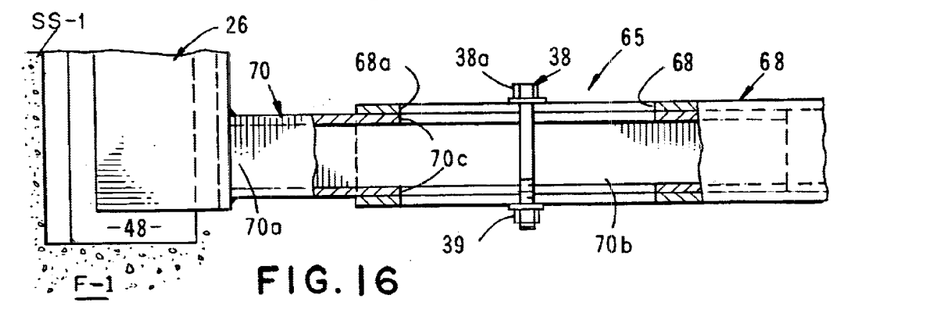
FIG. 16 is a cross-sectional view taken along lines 16—16 of FIG. 15.
Figure 17:
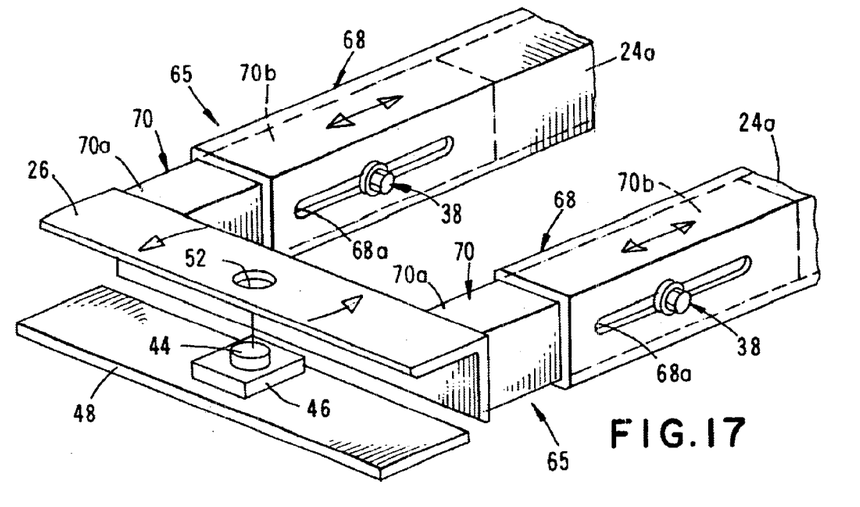
FIG. 17 is a generally perspective view of the alternate form of connector mechanism shown in FIGS. 15 and 16.

As best seen by referring to FIG. 4, the restraint means of the second connector means of the invention is similar in construction to the first restraint means and here comprises a pair of transversely extending bolts 40 that are carried by connector members 34. Each of the bolts 40 has a first end portion of 40a, a shank portion of 40b and a threaded second end portion of 40c that threadably accepts a nut 41. Bolts 40 extend through spaced apart, indexedly aligned apertures 34a (FIG. 10) formed in tubular connector members 34 and also extend through indexedly aligned elongated slots 36c formed in the sidewalls of each of the connector members 36. The shank portion 40b of each of the bolts 40 is in sliding engagement with the walls of the slots 36c so that, in a manner presently to be described, as members 36 telescopically move within tubular members 34 the bolts 40 will reciprocate within slots 36c. With this construction it is apparent that the telescopic movement of members 36 within tubular members 34 is limited by the length of the slots 36c. It is to be observed that in the construction shown in FIG. 5, the slots 28a are in outer tubes 28 with the tight round holes 36c being provided in the inner tubes or members 30. However, in the construction shown in FIG. 8 the slots 36c are formed in the inner tubes or members 36, with a tight round holes 34a being formed in the outer tubes 34. It is to be appreciated that, as illustrated in FIGS. 15, 16 and 17, if desired slots can be provided in both the inner and outer tubes to accomplish the restraint function. A more detailed description of this latter type construction will be provided in the paragraphs that follow.

Forming an important aspect of each of the connector mechanism 25 and 29 is interconnection means for interconnecting the connector mechanisms with a building structure. As best seen in FIG. 5 the interconnecting means of connector mechanism 25 comprises a generally cylindrically shaped, boss-like member 44 that is affixed to a first steel plate 46 that is, in turn, connected to a second steel plate 48. Steel plate 48 is affixed to structural support SS-1 by any suitable means such an anchor bolt 50. Member 44 is closely received within an aperture 52 formed in connector member 26 (see also FIG. 16). In similar manner, the interconnecting means of connector mechanism 29 comprises a generally cylindrically shaped, boss-like member 54 that is affixed to a first steel plate 56 that is, in turn, connected to a second steel plate 58 (see FIGS. 8 and 9). Steel plate 58 is also affixed to structural support SS-2 by any suitable means such as an anchor bolt 60. Member 54 is closely received within an aperture 55 formed in connector member 32.

Figure 11:
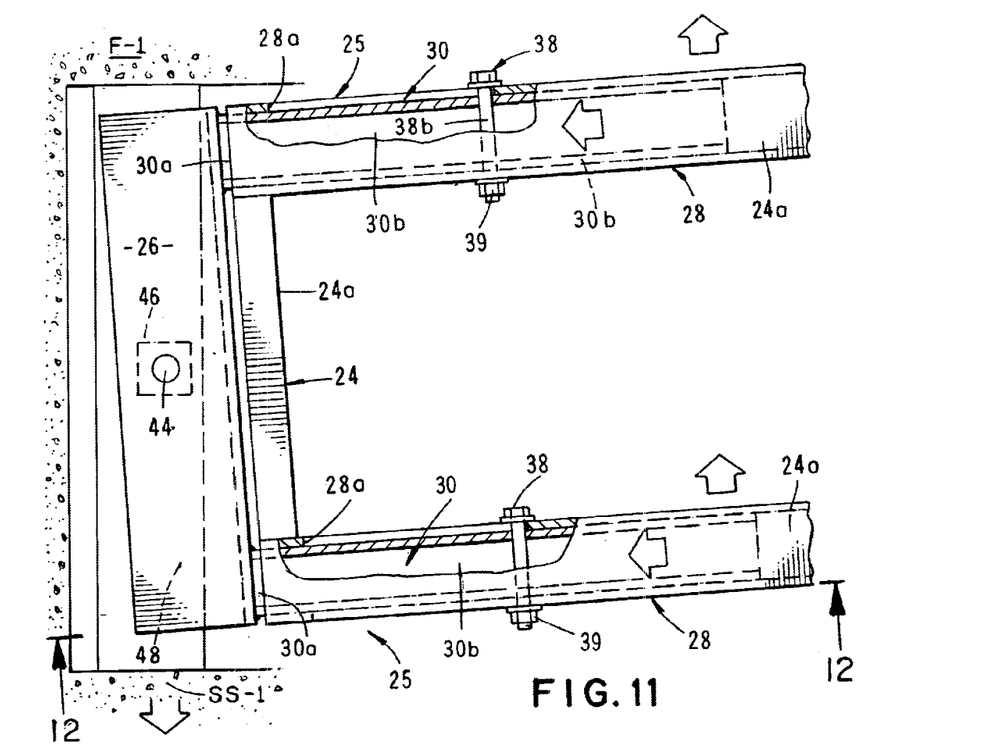
FIG. 11 is a view similar to FIG. 3, but showing the connector mechanism pivoted about a pivot anchor into a second position.
Figure 12:
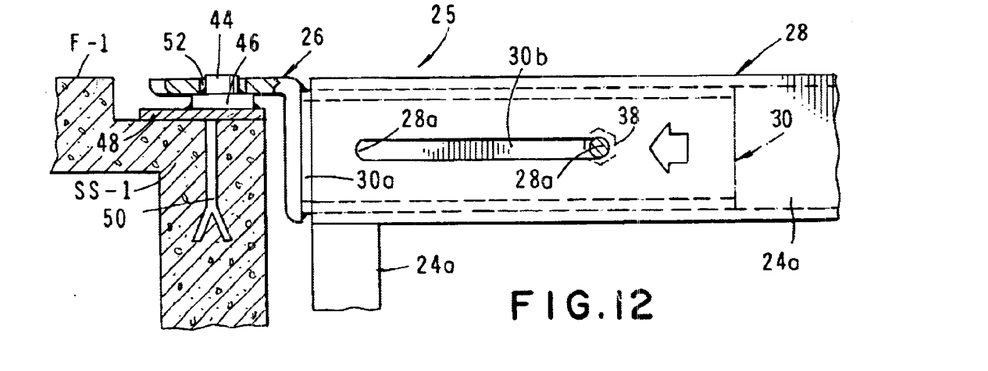
FIG. 12 is a view taken along lines 12—12 of FIG. 11.

With the escalator or moving stairs connected to the building structure by the first and second connection means of the invention in the manner shown in the drawings the moving stairs or treads 22 can be driven normal fashion by the driving means or motor 63 (FIG. 2A). In the event of an earthquake, the first connector mechanism 25 can move from the first position shown in FIG. 3 to the second position shown in FIG. 11. In the second position, mechanism 25 can pivot about member 44 into the position shown in FIG. 11 in response to lateral forces generated by the earthquake. Similarly, in response to oscillatory forces, connectors 30 can move from the extended position shown in FIG. 3 into the retracted position shown in FIG. 11 wherein bolt 38 is in engagement with the distal end of slot 28a (see also FIG. 12).

Figures 8, 9, 10:
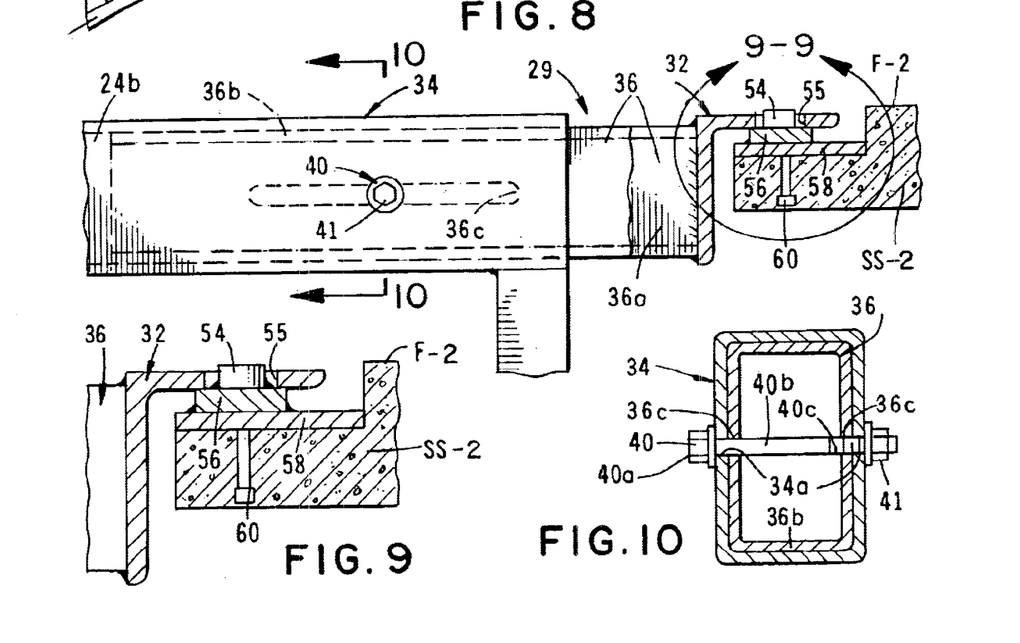
FIG. 8 is a cross-sectional view taken along lines 8—8 of FIG. 4.
FIG. 9 is enlarged cross-sectional view of the area designated in FIG. 8 and as "9—9".
FIG. 10 is a cross-sectional view taken along lines 10—10 of FIG. 8.
Figure 13:
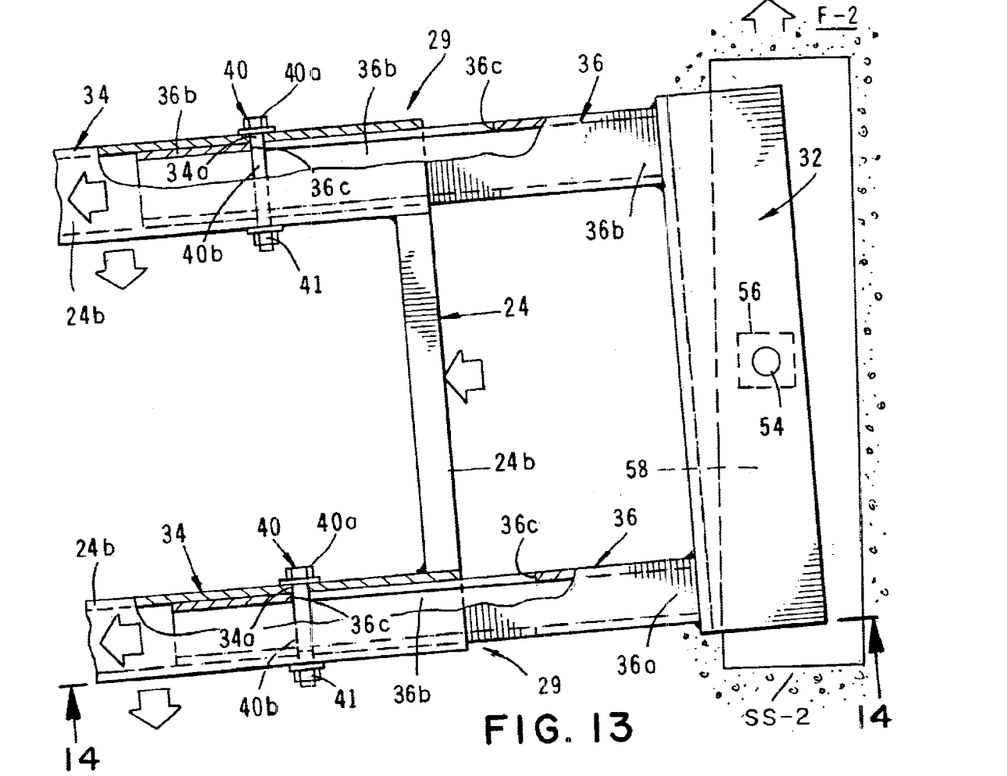
FIG. 13 is a view similar to FIG. 4, but showing the connector mechanism pivoted about a pivot anchor into a second position.
Figure 14:
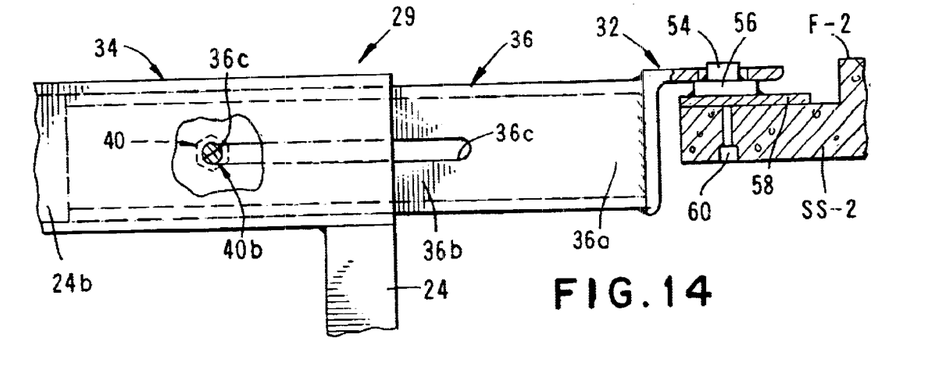
FIG. 14 is a view taken along lines 14—14 of FIG. 13.

In a similar manner, the second connector mechanism 29 will move from the first position shown in FIG. 8 to the second position shown in FIGS. 13 and 14. In the second position, mechanism 29 has pivoted about member 54 into the position shown in FIG. 11 in response to lateral forces generated by the earthquake. Similarly, in response to the oscillatory forces generated by the earthquake, connectors 36 will move from the partially extended position shown in FIG. 8 into the fully extended position shown in FIGS. 13 and 14 wherein bolt 40 is in engagement with the proximal end of slot 36c

Turning to FIGS. 15, 16 and 17, the previously identified alternate form of first connector means of the invention for connecting the first end 24a of each of the supporting trusses to the structural support SS-1 of the first floor is there shown. This connector means is similar in many respects to that shown in FIGS. 1 through 7 and like numerals are used in FIGS. 15, 16 and 17 to identify like components.

This alternate first connector means here comprises a connector mechanism 65 that includes a transverse connector 26 connected to the structural support SS-1 of the first floor, a pair of spaced apart second connectors 68 that are connected to first ends 24a of the supporting trusses and a pair of third connectors 70 that are disposed between first and second connectors 26 and 68. Each of the third connectors 70 has a first end 70a connected to first connector 26 and a body portion 70b telescopically receivable with a selected second connector 68. Each of the second connectors 68 comprises a steel tubular member that is generally rectangular in cross-section. However, once again, it is to be understood that connectors 68 can be circular in cross-section, or can have any other cross-sectional configuration that may be desired.

As before, the first connector means includes restraint means for limiting the extent of travel of the third connectors relative to the second connectors. In this latest form of the in invention the restraint means of the first connector means comprises a pair of transversely extending bolts 38 that are carried by connector members 68 and 70. Bolts 38 extend through spaced apart, indexedly aligned slots 68a formed in connector members 68 and also extend through indexedly aligned elongated slots 70c formed in the side walls of connectors 70 (FIG. 15). The head portions 38a of each of the bolts 38 as well as the nuts 39 are in sliding engagement with the outer walls of tubular members 68 so that as members 70 telescopically move within tubular members 68, the bolts 38 will reciprocate within slots 68a and 70c. With this construction it is apparent that the telescopic movement of members 30 within tubular members 28 is limited by the length of the slots 68a and 70c.

Figures 18, 19, 20:
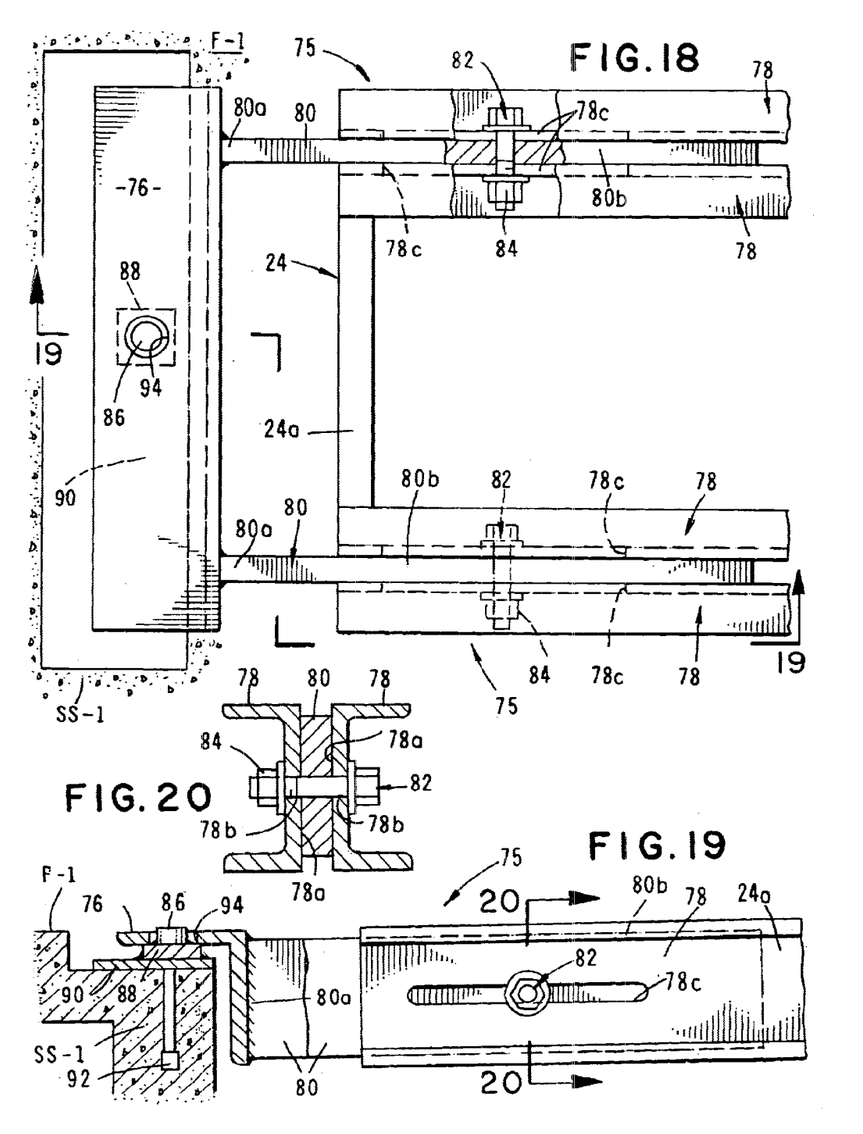
FIG. 18 is a top plan view of still another form of connector mechanism of the apparatus of the invention.
FIG. 19 is a cross-sectional view taken along lines 19—19 of FIG. 18.
FIG. 20 is a cross-sectional view taken along lines 20—20 of FIG. 19.

Referring now to FIGS. 18, 19 and 20, still another form of first connector means of the invention for connecting the first end 24a of each of the supporting trusses to the structural support SS-1 of the first floor is there shown. This connector means is also somewhat to that shown in FIGS. 1 through 7, but the cooperating telescopically movable components of the connector means are of a different construction.

This alternate first connector means here comprises a connector mechanism 75 that includes a transverse angle connector 76 that is connected to the structural support SS-1 of the first floor, a pair of spaced apart second connectors 78 that are connected to first ends 24a of the supporting trusses and a pair of third connectors 80 that are disposed between first and second connectors 76 and 78. Each of the third connectors 80 has a first end 80a that is connected to first connector 76 and a body portion 80b that is telescopically receivable between second connectors 78. Each of the second connectors 78 here comprises a steel member that is generally "U" shaped in cross-section (FIG. 20). Third connectors 80 here comprise elongated, plate like steel members that are receivable between the inner faces 78a of connectors 78 in the manner shown in FIG. 20.

As before the connector means of this latest form of the invention includes restraint means for limiting the extent of travel of the third connectors relative to the second connectors. In this latest form of the invention the restraint means comprises a pair of transversely extending bolts 82 that are carried by connector members 80. Bolts 82 extend through bores 78b formed in connector members 78 and also extend through spaced apart, indexedly aligned slots 78c formed in connector members 78. The head portions 82a and the nuts 84 which are threadably connected to the threaded shank portions of the bolts are in sliding engagement with the outer walls of members 78 so that as members 80 telescopically move within members 78, the bolts 82 will reciprocate within slots 78c. With this construction it is apparent that the telescopic movement of members 80 within members 78 is limited by the length of the slots 78c.

The interconnection means of this latest form of the invention for interconnecting the connector mechanisms with a building structure is substantially identical to that previously described. More particularly, the interconnecting means here comprises a generally cylindrically shaped member 86 that is affixed to a first steel plate 88 that is in turn connected to a second steel plate 90. Steel plate 90 is affixed to structural support SS-1 by means of an anchor bolt 92. Member 86 is closely received within an aperture 94 formed in connector member 76.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. In an escalator having a plurality of moving treads and a supporting truss for supporting the plurality of moving treads, the truss having first and second ends and being disposed between a first floor of a building having a structural support and a second floor of a building having a structural support, the improvement comprising:
   (a) a first connector means for connecting the first end of the supporting truss to the structural support of the first floor in a manner to permit relative movement between the supporting truss and the first floor of the building, said first connector means comprising:
      (i) a first connector connected to the structural support of the first floor;
      (ii) a second connector connected to said first end of said supporting truss; and
      (iii) a third connector disposed between said first and second connectors, said third connector having a first end connected to said first connector and having a body portion receivable with said second connector for telescopic movement with respect thereto; and
   (b) a second connector means for connecting the second end of the supporting truss to the structural support of the second floor in a manner to permit relative movement between the supporting truss and the second floor of the building.

2. The improvement as defined in claim 1 in which said second connector comprises an elongated tubular member.

3. The improvement as defined in claim 2 in which said first connector means further includes restraint means for limiting the extent of telescopic movement of said third connector relative to said second connector.

4. The improvement as defined in claim 3 in which said second connector is provided with an elongated slot and in which said restraint means comprises a transversely extending bolt carried by said third connector and extending through said slot.

5. The improvement as defined in claim 4 in which said third connector comprises an elongated tubular member.

6. The improvement as defined in claim 4 in which said first connector means further comprises interconnection means for interconnecting said first connector with said structural support of said first floor.

7. The improvement as defined in claim 6 in which said structural support of said first floor comprises a generally cylindrically shaped member and in which said interconnection means comprises an aperture formed in said first connector, said generally cylindrically shaped member being receivable within said aperture.

8. In an escalator having a plurality of moving treads, means for moving the plurality of moving treads and first and second spaced apart supporting trusses for supporting the plurality of moving treads, each of said first and second the trusses having first and second ends and each of said first and second trusses being disposed between a first floor of a building having a structural support and a second floor of a building having a structural support, the improvement comprising:
   (a) a first connector means for connecting the first ends of said first and second the supporting trusses to the structural support of the first floor in a manner to permit relative movement between the supporting trusses and the first floor of the building, said first connector means comprising:
      (i) a first transverse connector connected to the structural support of the first floor;
      (ii) a first connector connected to said first end of said first supporting truss;
      (iii) a second connector connected to said first end of said second supporting truss;
      (iv) a third connector disposed between said first transverse connector and said first connector, said third connector having a first end connected to said first transverse connector and having a portion telescopically receivable within the said first; and
      (v) a third connector disposed between said first transverse connector and said second connector, said third connector having a first end connected to said first transverse connector and having a portion thereof telescopically receivable with the said second connector;
   (b) a second connector means for connecting the second ends of the first and second supporting trusses to the structural support of the second floor in a manner to permit relative movement between the supporting trusses and the second floor of the building.

9. The improvement as defined in claim 8 in which said first connector means further comprises interconnection means for interconnecting said first connector with said structural support of said first floor.

10. The improvement as defined in claim 9 in which said structural support of said first floor comprises a generally cylindrically shaped member and in which said interconnection means comprises an aperture formed in said first connector, said generally cylindrically shaped member being receivable within said aperture.

11. The improvement as defined in claim 10 in which each of said first and second connectors comprises an elongated tubular member.

12. The improvement as defined in claim 11 in which each of said elongated tubular members include restraint means for limiting the extent of travel of said third connectors.

13. The improvement as defined in claim 12 in which each of said third connectors is provided with an elongated slot and in which said restraint means comprises a transversely extending bolt carried by each said elongated tubular member and extending through said slot thereof.

14. An escalator disposed between a first floor of a building having a structural support and a second floor of a building having a structural support, said escalator comprising:
   (a) a supporting truss having a first end and a second end;
   (b) a first connector means for connecting said first end of said supporting truss to the structural support of the first floor in a manner to permit relative movement between the escalator and the first floor of the building, said first connector means comprising:

(i) a first connector connected to the structural support of the first floor;

(ii) a second connector connected to said first end of said supporting truss; and (iii) a third connector disposed between said first and second connectors, said third connector having a first end connected to said first connector and having a body portion telescopically movable within said second connector; and (c) a second connector means for connecting said second end of said supporting truss to the structural support of the second floor in a manner to permit relative movement between the escalator and the first floor of the building.

15. The escalator as defined in claim 14 in an in which said second connector means comprises:

(a) a first connector connected to the structural support of the second floor;

(b) a second connector connected to said second end of said supporting truss; and (c) a third connector disposed between said first and second connectors, said third connector having a first end connected to said first connector and having a body portion telescopically movable within said second connector.

16. The escalator as defined in claim 14 in an in which said second connector comprises a pair of spaced apart structural members.

17. The escalator as defined in claim 14 in an in which said second connector comprises an elongated tubular member.

18. The escalator as defined in claim 14 in which said first connector means includes restraint means for limiting the extent of movement of said third connector relative to said second connector.

19. The escalator as defined in claim 18 in which said third connector is provided with an elongated slot and in which said restraint means comprises a transversely extending bolt carried by said elongated tubular member and extending through said slot.

20. The escalator as defined in claim 19 in which said third connector comprises an elongated tubular member.

* * * * *